United States Patent [19]
Plant et al.

[11] 3,947,620
[45] Mar. 30, 1976

[54] LIGHT TRANSMISSIVE LAMINATES

[75] Inventors: William J. Plant, Glenshaw, Pa.; John J. Szwarc, Fredonia, Wis.

[73] Assignee: Freeman Chemical Corporation, Port Washington, Wis.

[22] Filed: Aug. 23, 1974

[21] Appl. No.: 500,088

Related U.S. Application Data

[62] Division of Ser. No. 314,387, Dec. 12, 1972, abandoned.

[52] U.S. Cl. ............ 428/68; 178/7.8; 220/2.1 A; 220/2.3 A; 428/412; 428/426; 428/441; 428/442
[51] Int. Cl.² ............... H01J 29/00; H01J 31/00
[58] Field of Search ............. 161/192, 194, 183, 1; 178/7.8; 220/2.1 A, 2.3 A; 428/68, 76, 412, 426, 441, 442

[56] References Cited
UNITED STATES PATENTS

| | | |
|---|---|---|
| 3,008,995 | 11/1961 | Hoeschele et al. ............ 156/99 UX |
| 3,075,870 | 1/1963 | Hedler et al. ............ 220/2.1 A X |
| 3,301,743 | 1/1967 | Fekete et al. ............ 161/194 |
| 3,305,123 | 2/1967 | Nordby ............ 156/109 X |
| 3,311,700 | 3/1967 | Bulcraig et al. ............ 220/2.1 A UX |
| 3,315,035 | 4/1967 | Applegath et al. ............ 220/2.1 A UX |
| 3,321,099 | 5/1967 | Carlyle et al. ............ 220/2.1 A |
| 3,373,075 | 3/1968 | Fekete et al. ............ 161/185 |
| 3,422,298 | 1/1969 | DeGier ............ 220/2.1 A X |
| 3,551,235 | 12/1970 | Bossemir et al. ............ 156/99 |
| 3,558,387 | 1/1971 | Bossemir et al. ............ 156/99 |

*Primary Examiner*—Marion E. McCamish
*Attorney, Agent, or Firm*—Harry B. Keck; George E. Manias

[57] ABSTRACT

Multiple layer light transmissive laminates and a method for making them. Such laminates are particularly adapted for use as glazing materials. The laminates retain light transmissivity after exposure to elevated temperatures. The laminates include two or more layers of light transmissive sheets such as glass, polymerized methylmethacrylate and the like, bonded together by means of a thermosetting resin which is cured in the absence of free oxygen and in the absence of oxygen-generating polymerization initiators. The curing is achieved by means of radiation energy delivered through at least one light-transmissive sheet into the resin.

2 Claims, 5 Drawing Figures

U.S. Patent  March 30, 1976  3,947,620
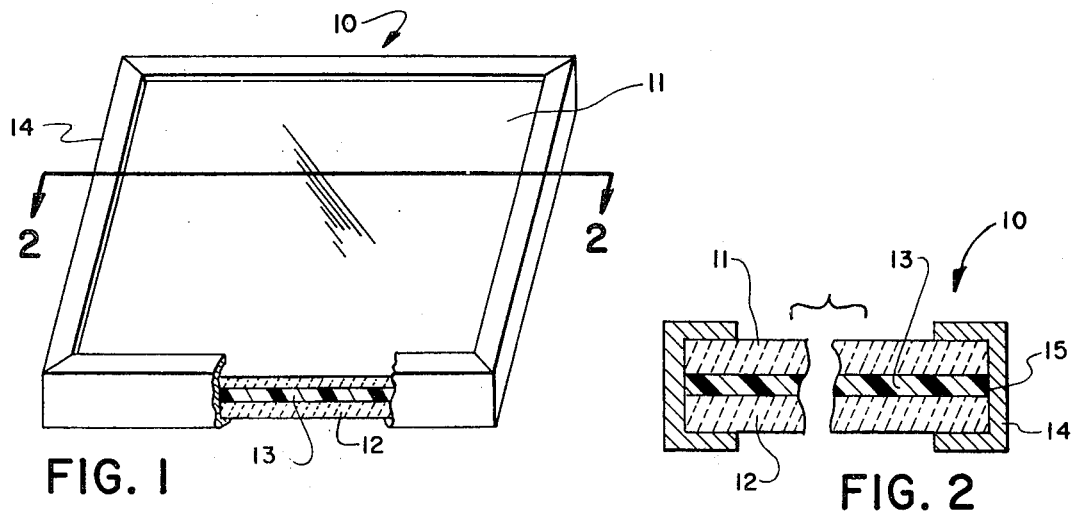
FIG. 1
FIG. 2
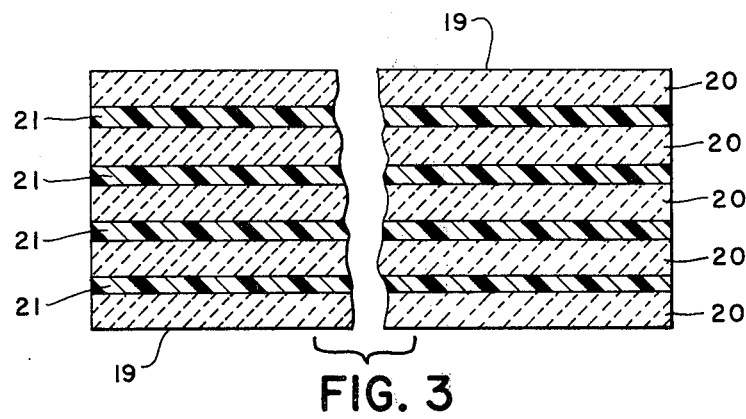
FIG. 3
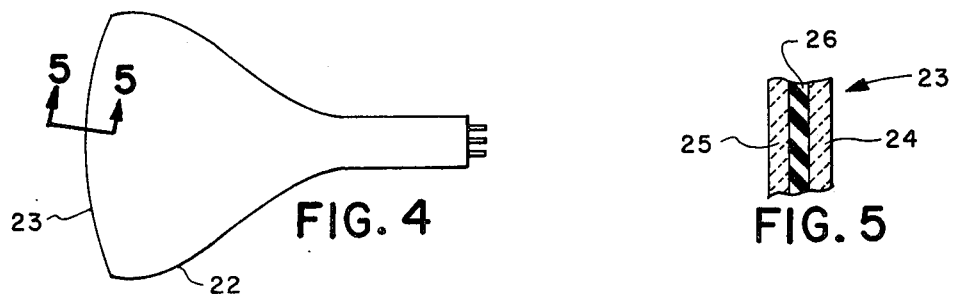
FIG. 4
FIG. 5

LIGHT TRANSMISSIVE LAMINATES

This is a division of application Ser. No. 314,387, filed Dec. 12, 1972, now abandoned.

BACKGROUND OF THE INVENTION

1. Field of the Invention

The invention relates to light transmissive laminates and a method of making them and more particularly to such laminates wherein two or more sheets of light transmissive material are bonded together by means of a thermosetting resinous composition.

2. Description of the Prior Art

Light transmissive laminates are well known. Safety glass which is employed in automobiles and elsewhere is an example of a light transmissive laminate formed from two sheets of glass bonded together by means of an adhesive resinous substance. Aircraft glazing frequently employs multiple layers of glass or similar transparent sheets such as polyermized methylmethacrylate, bonded together by means of a suitable light transmissive adhesive which may be polymerized methylmethacrylate. In the past such laminates have become discolored when exposed to elevated temperatures. The canopy of a jet aircraft, for example, becomes quite hot as the plane moves through the atmosphere at modern airplane speeds. The glazing further is heated significantly when the aircraft is parked on the ground in direct sunlight. After several hundred hours of exposure to elevated temperatures of the order of 300°F, the adhesive binder between the light transmissive sheets deteriorates and the overall light transmissive properties of the laminate are diminished. Discolored glazing can be observed at many present day aircraft storage facilities.

In forming laminates from acrylic polymer sheets, the exothermic reaction of conventional thermosetting bonding resins may create dimensional alterations in the acrylic polymer sheets resulting in vision-distorting deformations.

The present method is especially useful in the production of television picture tubes which require a transparent faceplate and also a transparent safety coverplate.

SUMMARY OF THE INVENTION

According to the present invention the resinous component which bonds the light transmissive sheets in a light transmissive laminate is a material which is thermosetting via addition-polymerization and which can be cured by exposure to radiation such as ultraviolet radiation or electron bombardment. The resin is one which is preferably water-white and is provided and maintained without the familiar oxygen-generating polymerization initiators such as peroxides. Convention thermal cure for thermosetting resins employs such oxygen-generating initiators. The radiation cures employ instead sensitizer materials such as benzophenone and acetophenone which are themselves sensitive to ultraviolet radiation and which release free radicals when thus exposed. It is essential that the laminate be sealed around its edges to preclude entry of atmospheric oxygen in contact with the adhesive. This can be done by means of taping, framing, lacquering and the like. The resulting laminates are exposed to polymerizing radiation which is delivered through one or more of the light transmissive sheets into the resin to effect the cure. The time required for the cure may vary according to the resin and according to the intensity of the radiation source, but in general exposures of 0.5 to about 100 minutes is considered reasonable for curing the laminates.

Where one or more of the light transmissive sheets comprises an acrylic polymer, the present curing system introduces further advantages because there is no exotherm when the binder resin is cured by means of radiation. The absence of an exotherm avoids dimensional alteration of the acrylic polymer sheets.

BRIEF DESCRIPTION OF THE DRAWINGS

FIG. 1 is a perspective view of a typical multi-layer laminate of this invention;

FIG. 2 is an enlarged cross-section view taken along the line II—II of FIG. 1 showing the construction of the present multi-layer laminate;

FIG. 3 is a cross-section view of another multi-layer laminate according to the invention; and FIG. 4 is a view of a typical television picture tube; and FIG. 5 is a cross-sectional view of the face of the television tube of FIG. 4 taken along the line 5—5.

DESCRIPTION OF THE PREFERRED EMBODIMENT(S)

A typical glass laminate is shown in FIGS. 1 and 2 wherein a pair of light transmissive sheets 11, 12 are secured together by means of an interposed thermosetting binder 13. The edges of the laminate are sealed by means of suitable tape 14 which is applied after the laminate 10 is assembled. The purpose of the tape 14 is to preclude entry of atmospheric air into the resinous binder 13 along the otherwise exposed edge 15. The tape 14 is one embodiment of a perimeter sealing means. Other embodiments include framing or lacquering. The perimeter sealing means should span the space between the light transmissive sheets 11, 12 over the entire perimeter thereof.

The light transmissive sheets 11, 12 may be any essentially transparent material such as glass, transparent plastics such as polymethylmethacrylate, polyesters, vinyl chloride, polycarbonate, polyamide, polyurethane elastomer, and the like. The light transmissive sheets 11, 12 are preformed to the desired shape of the laminated article and are not necessarily flat as indicated in FIGS. 1 and 2. For example, where the multiple layer laminate is intended for use as an airplane canopy glazing component, the sheets 11, 12 will be provided in a suitably contoured shape before they are assembled into the present laminate.

The adhesive bonding resin 13 is a thermosetting resinous material which polymerizes through addition polymerization, is essentially water-white, is curable upon exposure to radiation such as ultraviolet radiation or electron bombardment, and is essentially free of free oxygen and does not contain any oxygen generating polymerization initiators such as benzoyl peroxide, cumene hydroperoxide and the like.

There is no requirement that the two light transmitting sheets 11, 12 be fabricated from the same material. They can and in some instances desirably are fabricated from different substances.

Suitable resinous materials include polyacrylic polyesters. A particularly desirable resinous substance is the polymerizable reaction product of two mols of acrylic or methacrylic acid and one mol of diglycidal ether of bisphenol-A, as described in U.S. Pat. Nos. 3,301,743 and 3,373,075. Such material is suitably sensitized by the addition of 0.1 – 2.0 per cent by weight of an ultraviolet radiation sensitizer such as benzophenone or acetophenone.

With the laminate assembled as shown in FIG. 2, the binding resin is cured by delivering polymerizing radiation through one or the other or both of the two sheets 11, 12. A suitable source of ultraviolet radiation is convention ultraviolet radiation generating lamps which are readily available commercially.

The light transmissive laminates may be prepared in several ways which are well-known in the art, i.e., by introducing the polymerizable resin between two spaced apart sheets of glass or other transparent material; or by applying a coating of the resin to the opposing surfaces of the two sheets of glass or other light transmissive material and thereafter impressing the coated sheets together.

EXAMPLE

A radiation sensitive polymerizable resinous composition was prepared by combining 90 parts by weight of a diacrylate resin with 10 parts by weight of methylmethacrylate. The diacrylate resin was prepared by combining 2 mols of methacrylic acid with 1 mol of diglycidal ether bisphenol-A in the manner described in U.S. Pat. No. 3,373,075. The resin system was sensitized by the addition of one per cent by weight benzophenone. The sensitized resin was sandwiched between two sheets of Pyrex brand heat-resistant glass, each one-quarter inch thick. The resin thickness was one-quarter inch. The overall laminate had a thickness of three-quarters inch. The sandwich was cured under a 1 kilowatt mercury vapor lamp exposed for 35 minutes. The resulting laminate was water-white. The laminate was exposed to a thermal aging test at 300°F for 100 hours without experiencing significant loss in light transmission properties.

Similar laminates were prepared with the glass being replaced by transparent acrylic sheets. In these laminates, the acrylic had a thickness of 0.125 inch, the resin had a thickness of 0.0132 inch and the overall laminate had a thickness of 0.281 inch. The laminate was exposed to ultraviolet radiation by means of a one kilowatt mercury vapor lamp disposed 12 inches away from the specimen. The exposure was continued for 2 minutes.

The resulting laminate had a heat resistance superior to a corresponding laminate produced with peroxide-cured castings. The laminate exhibited good adhesion between the layers and also displayed good moisture resistance when cycled between wet and dry exposures.

Other suitable ultraviolet radiation initiators include: 2-naphthalene-sulfonyl chloride; methyl-, ethyl- or butyl- ethers of benzoin; and Michler's Ketone.

A particular preferred embodiment of this invention is the production of television picture tubes wherein the tube itself normally has a transparent glass faceplate to which a transparent glass safety coverplate must be adhered. The present clear laminating plastic is applied between the faceplate and the coverplate substantially bubble-free. The laminating plastic is cured by addition polymerization of ethylenic unsaturation groups and is substantially free of residue of oxygen-generating polymerization initiators. The curing preferably occurs from ultraviolet exposure of the laminate without substantially increasing the temperature of the television tube while the resin is substantially completely cured.

As shown in FIG. 3, multiple layer laminates 19 may be prepared from plural glass sheets 20 and plural resin layers 21.

A typical television tube 22 is shown in FIG. 4 having a picture face 23. The picture face 23 is shown in a cross-sectional view in FIG. 5 as having a glass faceplate 24 and a glass coverplate 25 which is overlying and spaced apart from the faceplate. A layer 26 of clear laminating plastic according to this invention is provided substantially bubble-free between the two glass plates 24, 25. Sealing means is supplied spanning the space between the faceplate and the coverplate over their entire perimeter to preclude exposure of the plastic to air.

We claim:

1. A multiple layer light transmissive laminate comprising at least two light transmissive sheets separated by a cured light transmissive resin composition which is essentially free of residues of oxygen generating polymerization initiators, said resin serving as a binder between the said two sheets, and sealing means spanning the space between the two said sheets over the entire perimeter thereof to preclude exposure of the resin to air.

2. In a television picture tube assembly:
a glass faceplate and a glass safety coverplate overlying and spaced apart from said faceplate,
a clear laminating plastic between said faceplate and said coverplate substantially bubble-free,
said plastic being substantially entirely cured by addition polymerization of ethylenic unsaturation groups and being substantially free of residues of oxygen generating polymerization initiators,
and sealing means along the entire perimeter of said laminating plastic spanning the space between the edges of the said faceplate and the said coverplate to preclude exposure of the said plastic to air.

* * * * *